United States Patent
Bell et al.

(10) Patent No.: US 10,794,741 B2
(45) Date of Patent: Oct. 6, 2020

(54) FLOW MEASUREMENT INSERT AND SYSTEM FOR USE WITH ORIFICE FITTING

(71) Applicant: Bell Technologies, LLC, Katy, TX (US)

(72) Inventors: Joel David Bell, Katy, TX (US); Zaki Din Husain, Katy, TX (US)

(73) Assignee: BELL TECHNOLOGIES, LLC, Katy, TX (US)

(*) Notice: Subject to any disclaimer, the term of this patent is extended or adjusted under 35 U.S.C. 154(b) by 0 days.

(21) Appl. No.: 16/586,941

(22) Filed: Sep. 28, 2019

(65) Prior Publication Data

US 2020/0109975 A1 Apr. 9, 2020

Related U.S. Application Data

(60) Provisional application No. 62/742,287, filed on Oct. 6, 2018.

(51) Int. Cl.
*G01F 1/42* (2006.01)
*G01M 3/02* (2006.01)

(52) U.S. Cl.
CPC .................. *G01F 1/42* (2013.01); *G01M 3/02* (2013.01)

(58) Field of Classification Search
CPC .................................... G01F 1/42; G01M 3/02
See application file for complete search history.

(56) References Cited

U.S. PATENT DOCUMENTS

| | | |
|---|---|---|
| 7,357,040 B2 | 4/2008 | Bell |
| 7,461,563 B1 * | 12/2008 | Peng ...................... G01F 1/42 73/861.52 |
| 8,136,414 B2 | 3/2012 | Steven |
| 8,166,801 B2 | 5/2012 | Sinha |
| 9,841,303 B2 * | 12/2017 | Crouch .................. G01F 1/42 |
| 9,933,289 B2 * | 4/2018 | Jay ......................... G01F 1/42 |
| 10,054,472 B1 | 8/2018 | Bell |
| 10,060,841 B2 | 8/2018 | Bell et al. |
| 2006/0231149 A1 * | 10/2006 | Kulkarni ................ G01F 1/42 138/44 |
| 2016/0131510 A1 * | 5/2016 | Knoll ..................... E05B 67/383 73/861.61 |
| 2019/0137308 A1 | 5/2019 | Bell et al. |

* cited by examiner

*Primary Examiner* — Jewel V Dowtin
(74) *Attorney, Agent, or Firm* — Shawn Hunter

(57) ABSTRACT

Flow measurement inserts replace standard orifice plates within single or dual-chamber orifice fittings. Flow measurement inserts are described which have insert bodies are shaped and sized to reside within the flow bore insert chamber of standard orifice fittings. An exemplary flow measurement insert includes an insert body with an opening formed therein which will align with the flow bore of the orifice fitting when the flow measurement insert is disposed within the chamber.

17 Claims, 6 Drawing Sheets

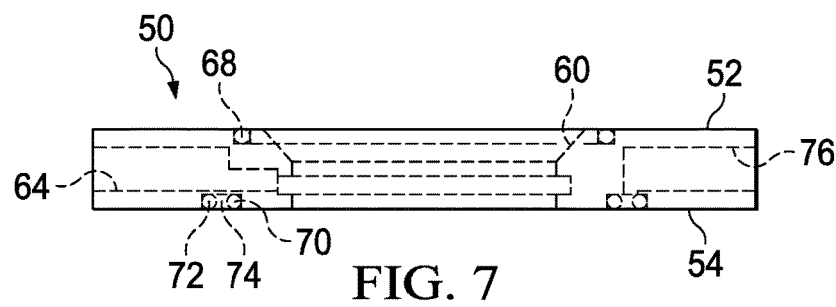
FIG. 7
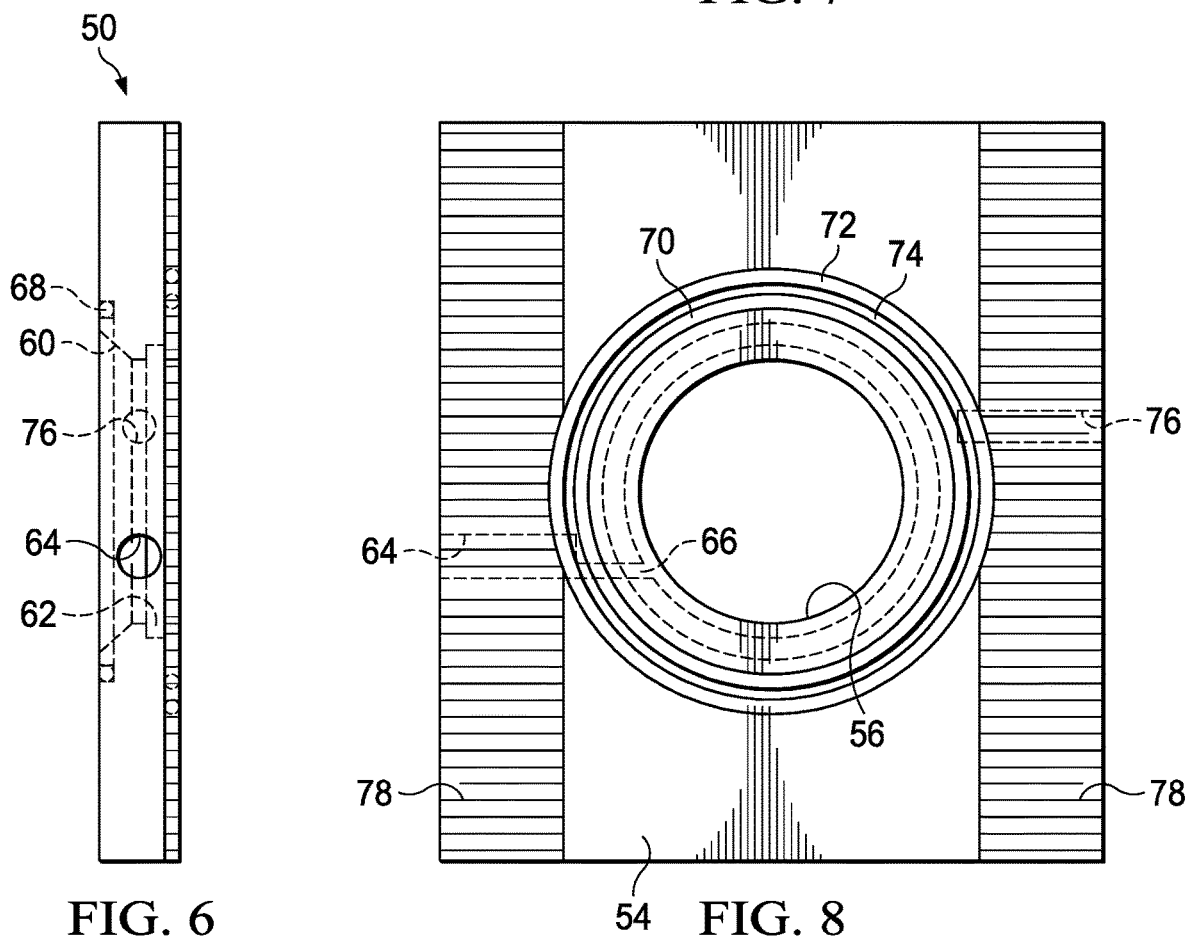
FIG. 6
FIG. 8

FLOW MEASUREMENT INSERT AND SYSTEM FOR USE WITH ORIFICE FITTING

BACKGROUND OF THE INVENTION

1. Field of the Invention

The invention relates generally to devices and methods for measuring the volume and/or rate of fluid flowing through a flowbore.

2. Description of the Related Art

Orifice plate systems are routinely used for measurement of fluid flow through pipelines. An orifice plate is a well-known device which provides a flow restriction for a flow bore. Measurement of pressure upstream and downstream of the orifice plate allows flow rate to be calculated.

Natural gas, liquids and other similar flows through pipelines often employ an apparatus known as an orifice fitting which is a housing which retains a replaceable orifice plate within. Housings can be either a single-chamber or a dual-chamber housing. Single-chamber orifice fittings provide a housing with valves which allow flow through a pipeline to be closed off upstream and downstream of the orifice plate temporarily so that the orifice plate may be removed and inspected or, if necessary, replaced. Dual-chamber orifice fittings have an internal slide valve in the housing that can isolate one chamber from the other. In the present dual-chamber orifice fitting design, the lower chamber is aligned to the flow bore for the pipeline. By moving the internal slide valve, an orifice plate can be moved from the lower chamber to an upper chamber. By moving the slide valve to isolate the lower chamber from the upper chamber and depressurizing only the upper chamber, the orifice plate can be removed from the orifice fitting to inspect or replace, if required. Unlike single-chamber orifice fittings, dual-chamber orifice fittings allow inspection or replacement of an orifice plate without interrupting flow through the flow bore. By reversing the orifice plate removal process, an orifice plate can be placed back into the lower chamber. An orifice meter can then continue to measure flow rate based upon the dimensional parameters of the inserted orifice plate. Single-chamber and dual-chamber orifice fittings are available commercially from a number of manufacturers, such as Emerson and Canalta Controls.

SUMMARY OF THE INVENTION

The invention provides flow measurement inserts which can be used to replace standard orifice plates within single or dual-chamber orifice fittings. Exemplary flow measurement inserts are described which have insert bodies are shaped and sized to reside within the flow bore insert chamber of standard orifice fittings. An exemplary flow measurement insert includes an insert body with an opening formed therein which will align with the flow bore of the orifice fitting when the flow measurement insert is disposed within the chamber. The opening is defined by a sill, and a pressure detection port is formed within the sill. In described embodiments, an annular groove is formed within the sill to equalize detected pressure as around the circumference of the opening.

In described embodiments, a flow measurement insert includes a leak detection arrangement. First and second o-ring seals are disposed upon a face of the insert body. The first and second o-ring seals are unequal in size and define a radial space therebetween when disposed upon the insert body face. A leak detection passage is in fluid communication with the radial space.

In certain described embodiments, the flow measurement insert is provided with a lifting bar which will permit the insert to be easily inserted into and removed from the chamber of a single chamber orifice fitting. In this embodiment, it is preferred that a fluid passage, which is in fluid communication with the pressure detection port, be defined at least partially within the lifting bar.

BRIEF DESCRIPTION OF THE DRAWINGS

For a thorough understanding of the present invention, reference is made to the following detailed description of the preferred embodiments, taken in conjunction with the accompanying drawings, wherein like reference numerals designate like or similar elements throughout the several figures of the drawings and wherein:

FIG. 6 is a side view of the flow measurement insert of FIGS. 3-5.

FIG. 7 is top view of the flow measurement insert of FIGS. 3-6.

FIG. 8 is a front view of the flow measurement insert of FIGS. 3-7.

DETAILED DESCRIPTION OF THE PREFERRED EMBODIMENTS

Figure 1:
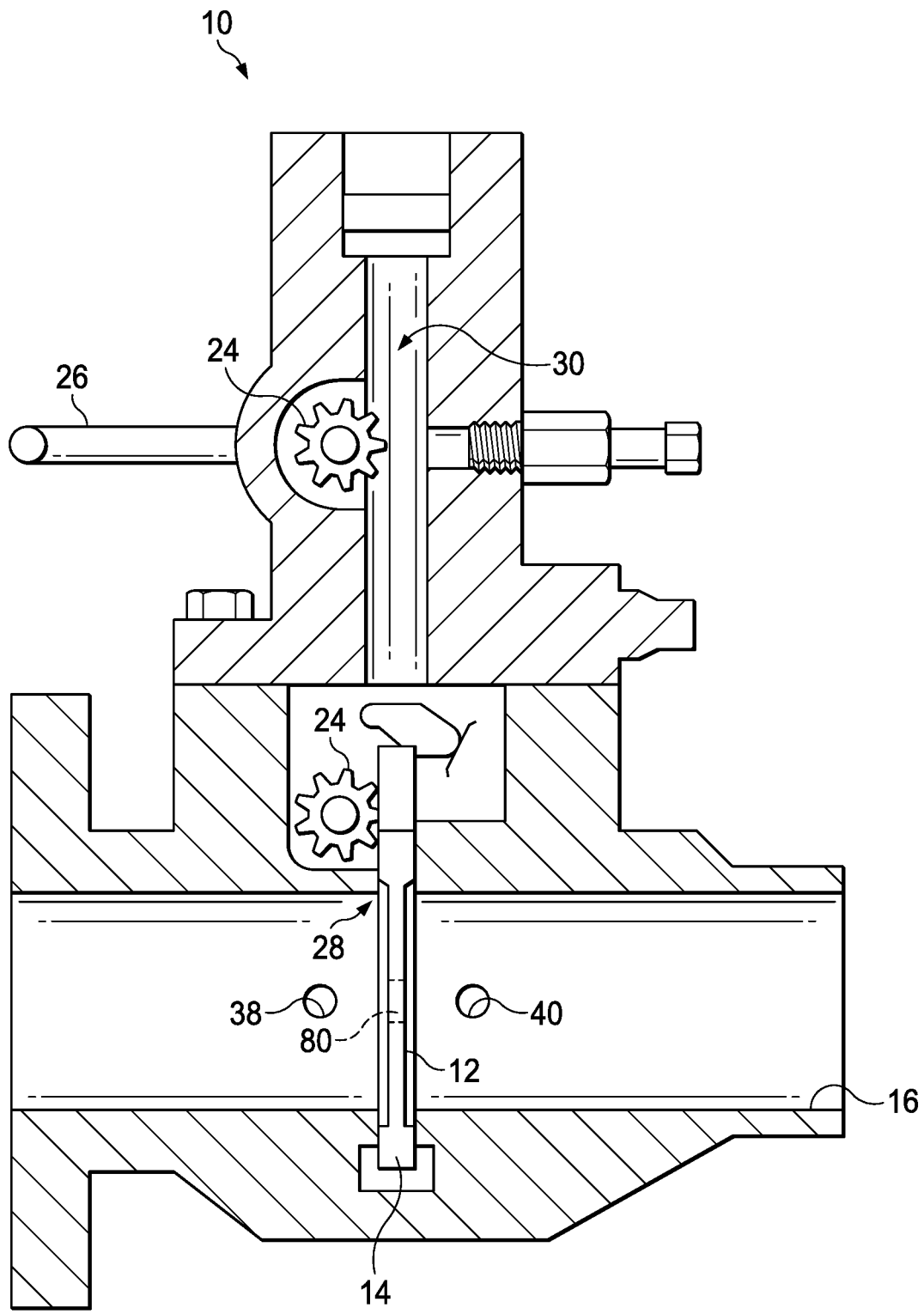
FIG. 1 is a side, cross-sectional view of an exemplary orifice plate carrier.
Figure 2:
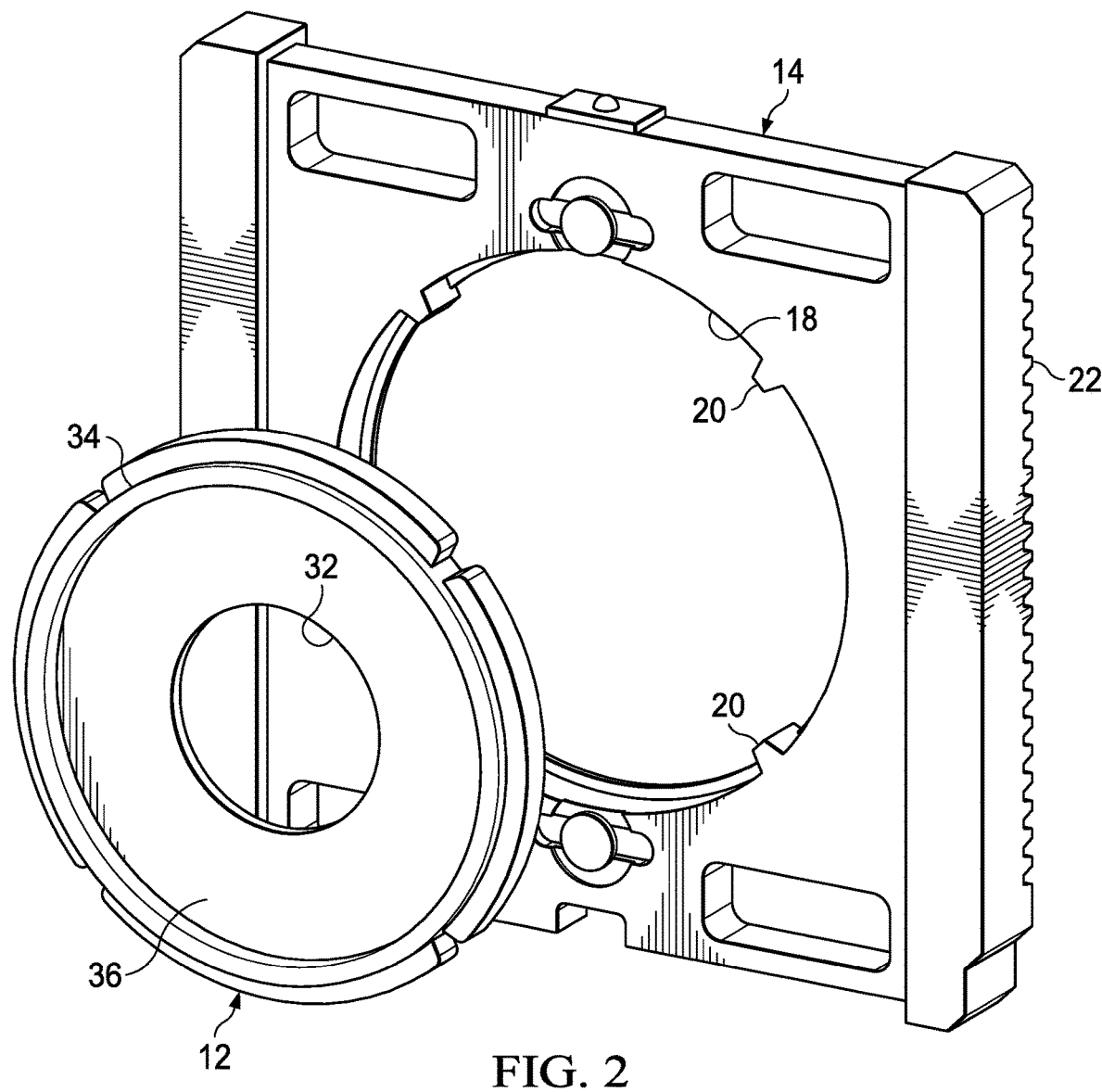
FIG. 2 is an isometric view of an exemplary orifice plate carrier and orifice plate.
Figure 3:
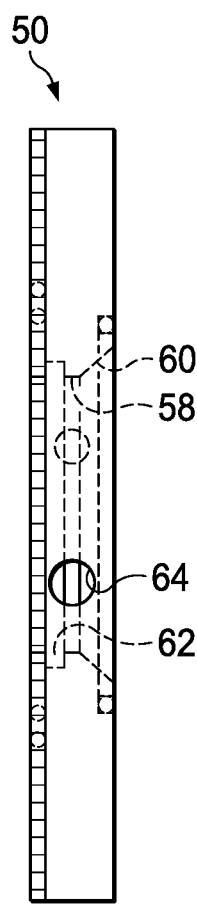
FIG. 3 is a side view of an exemplary flow measurement insert constructed in accordance with the present invention.

An exemplary orifice fitting 10 is depicted in FIG. 1. The orifice fitting 10 includes an orifice fitting housing which defines a flow bore 16 and at least one chamber within which an orifice plate insert is retained. In dual-chamber orifice fittings, the orifice plate 12 is typically held within an orifice plate carrier 14, which is a frame that retains the orifice plate centrally within the flow bore 16 when the orifice plate carrier 14 is inserted into the orifice fitting 10. An exemplary orifice plate carrier 14 and orifice plate 12 are shown in FIG. 2. The orifice plate carrier 14 includes an opening 18 with tangs 20 which retain the orifice plate 12 within the opening 18. A side surface 22 of the orifice plate carrier 14 is provided with teeth which intermesh with complementary teeth of gears 24 within the orifice fitting 10. A crank handle 26 is provided which rotates the gears 24 and allows the carrier 14 to be moved within the orifice fitting 10 between a first chamber 28, wherein the carrier 14 and retained orifice plate 12 are disposed within the fluid flow bore 16, and a second chamber 30, wherein the carrier 14 and orifice plate 12 are withdrawn from the fluid flow bore 16.

Replaceable orifice plate 12 includes a central opening 32, which provides the flow restriction, and compressible seals 34 on each axial face 36. When the orifice plate carrier 14 is inserted into the housing of the orifice fitting 10, the seals 34 will seal against interior portions of the orifice fitting 10. FIG. 1 illustrates upstream and downstream pressure measurement ports 38, 40. Fluid pressure measurement equipment, of a type known in the art, may be attached to the measurement ports 38, 40 in order to measure fluid pressure upstream and downstream of the orifice plate 12.

FIGS. 3-8 illustrate an exemplary flow measurement insert 50, in accordance with the present invention. The flow measurement insert 50 will replace both the orifice plate 12 and orifice plate carrier 14 described above. It is also possible to seal weld a flow restriction device, such as a Torus Wedge, to a modified plate carrier to achieve similar measurement capability as that of a solid measurement insert 50. The flow measurement insert 50 has an insert body which is shaped and sized to have the same width, length and height as the orifice plate carrier 14 so that it can replace the carrier 14 in the orifice fitting 10. The flow measurement insert 50 presents an upstream face 52 and a downstream face 54. A central opening 56 is defined within the insert 50. The central opening 56 will provide a flow restriction for the flow bore 16 when inserted into the orifice fitting 10. A substantially flat sill 58 defines the central opening 56. The central opening 56 also presents a circular angled upstream surface 60 which extends from the upstream face 52 and adjoins the sill 58. An annular groove 62 is formed within the sill 58. A pressure detection port 64 is in fluid communication with the annular groove 62 via fluid passageway 66.

Although not depicted, it should be understood that the flow measurement insert 50 may be designed to provide an angled upstream surface 60 on both axial sides of the insert with plate thickness to match the clearance necessary for the insert 50 to travel within the orifice fitting with single or double o-ring design (described below). This plate configuration is useful for monitoring bi-directional flows. In FIG. 1, when flow is from left to right, the differential pressure between upstream pressure tap 38 and the center tap 56 is monitored to calculate the flow rate. If the flow were from right to left, the differential pressure between the pressure tap 40 and the center tap 56 would be monitored to calculate the flow rate. This bidirectional flow metering capability eliminates any need to install a bypass line with flow isolation valves.

Returning to the illustrated embodiment, an o-ring seal 68 is provided on the upstream face 52 and which will seal against interior surfaces within the orifice fitting 10. The downstream face 54 of the insert 50 may carry a single double o-ring seal. A double o-ring seal is made up of an inner o-ring seal 70 and an outer o-ring seal 72. Radial space 74 is defined between the inner and outer o-ring seals 70, 72. A leak detection passage 76 is formed within the body of the insert 50 and is in fluid communication with the radial space 74. Leak detection apparatus, of a type known in the art, can be interconnected with the leak detection passage 76 in order to detect any fluid flowing through the flow bore 16 which leaks beyond the inner o-ring seal 70. The use of two o-rings 70, 72, a radial space 74 and a leak detection passage 76 is referred to generally herein as a double block and bleed arrangement. It is further noted that, although a double block and bleed arrangement is depicted herein in FIGS. 3-8 as only being used on one axial side of the insert 50, such double block and bleed arrangements may be used for either or both axial sides of an insert.

The flow measurement insert 50 provides toothed portions 78 which are shaped and sized to intermesh with teeth on gears 24. The toothed portions 78 should be shaped and sized to match the shape and size of the teeth of side surface 22 for a standard orifice plate carrier 14.

When the insert 50 replaces a standard orifice plate 12 and carrier 14, fluid pressure will be detected at the point of flow restriction (via fluid passageway 66) rather than upstream of an orifice plate 12. This can be accommodated by drilling a process port in the approximate location of 80 in FIG. 1 between ports 38 and 40.

Figure 9:
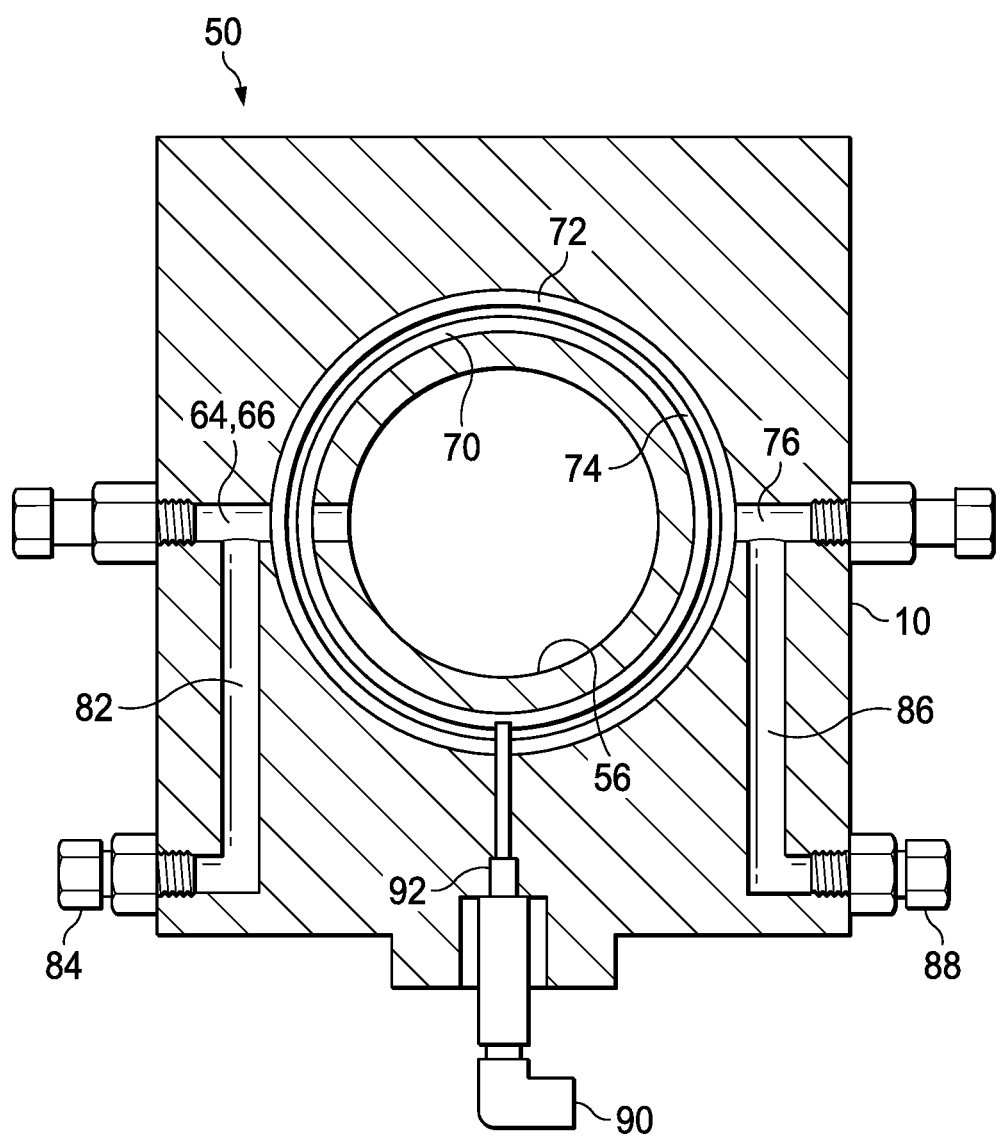
FIG. 9 is a schematic, cross-sectional view of an exemplary flow measurement insert seated within an orifice fitting.

FIG. 9 is a schematic, cross-sectional view of the insert 50 seated within an orifice fitting 10 and which helps illustrate the leak detection features of the invention in further detail. Fluid passage 82 extends from pressure detection port 64 down to drain connection 84. Fluid passage 86 extends from leak detection passage 76 to drain connection 88. It should be noted that the threaded nuts at 84, 88 and the like in FIG. 9 are schematic only and not necessary for the actual connection. Further, a connection 90 is in fluid communication with radial space 74. In the depicted arrangement, porting connections to port 64 and passage 76 are processed from the bottom of the insert 50, and the connections are completed through the drain connections 84, 88 located on both sides of the insert 50. Alternatively, both port 64 and passage 76 can be connected on one or both sides depending on the drain connections. If desired, the connection 90 may replace drain connections 84, 88. Preferably, connection 90 is connected to the low-pressure leg of a differential pressure sensor while the upstream port 40 is connected to the high-pressure leg of the differential pressure sensor.

In an alternative construction, both of the fluid passages 82, 86 are in fluid communication with the central opening 56. With this construction, leak detection is not performed in favor of a redundant pressure detection path for the central opening and the flowbore 16.

Figure 4:
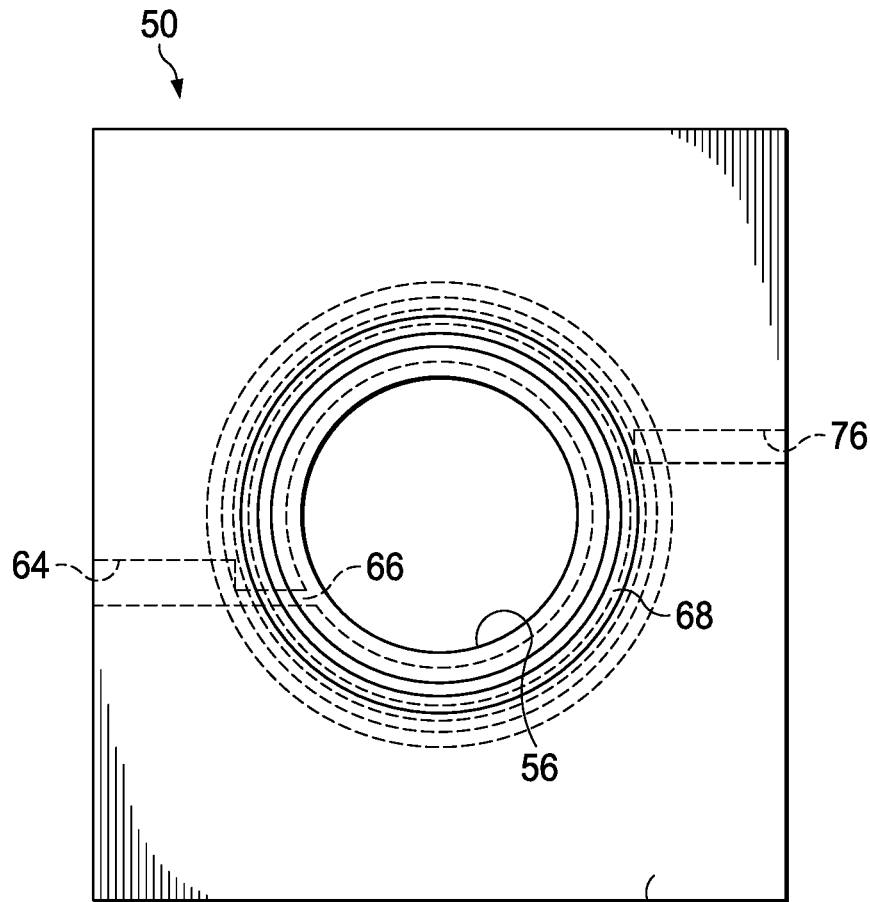
FIG. 4 is a front view of the flow measurement insert shown in FIG. 3.
Figure 5:
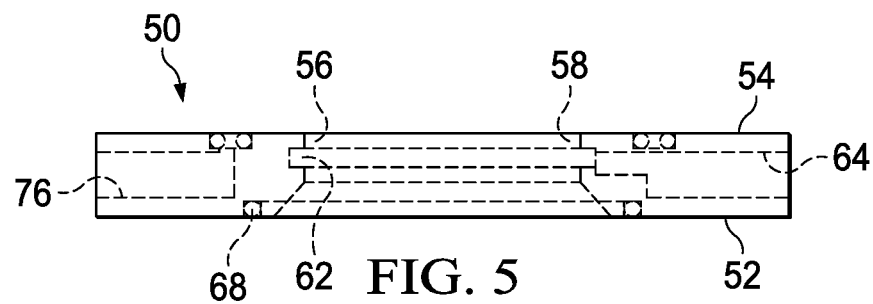
FIG. 5 is a top view of the flow measurement insert of FIGS. 3-4.

The centering pin 92 located in the bottom of the insert 50 can be drilled or replaced by a hollow core bolt to connect to either 66 or 76 in FIG. 4 which allows monitoring of pressure at central opening 56. The centering pin 92 helps ensure that the insert 50 is properly aligned within the orifice fitting and preferably ensures that the central opening 56 of the insert is in proper alignment with the flow bore 16 within the orifice fitting.

Figure 10:
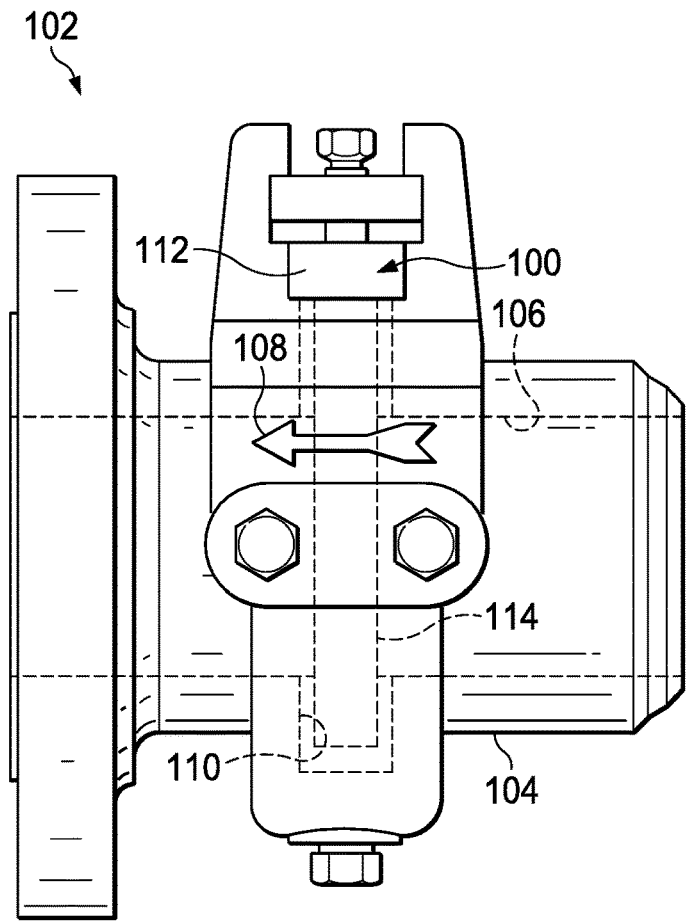
FIG. 10 is a side view of an exemplary single chamber orifice fitting with flow measurement insert.
Figure 11:
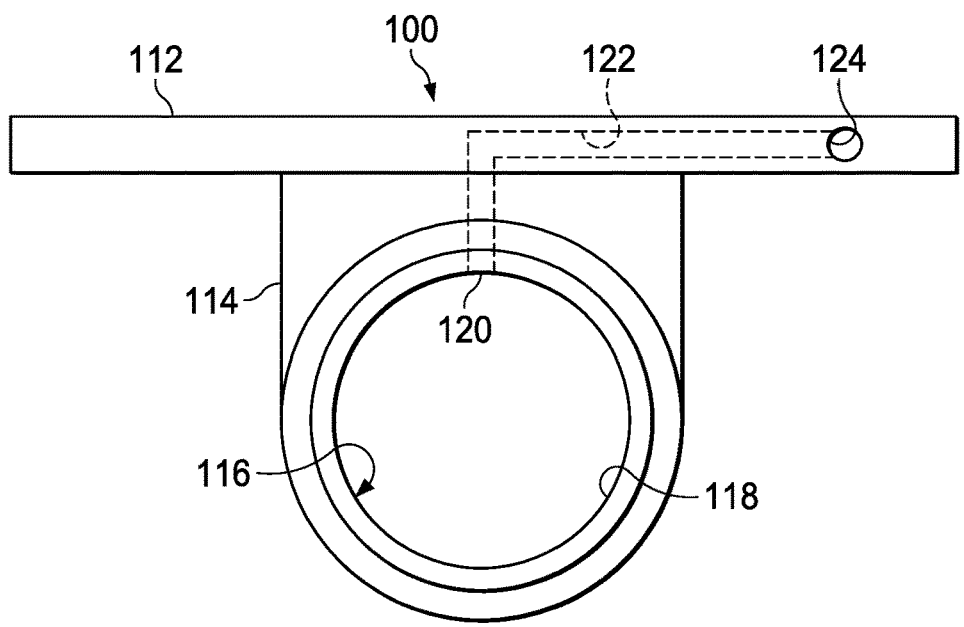
FIG. 11 is a front view of the flow measurement insert of FIG. 10.

Single-chamber orifice fittings require the fitting to be completely isolated from flow through the flow bore it is associated with while the orifice plate is removed for inspection and/or replacement. However, a flow measurement insert for a single chamber orifice fitting can also be accomplished in accordance with the present invention. FIGS. 10 and 11 illustrate use of an exemplary flow measurement insert 100 with a single chamber orifice fitting 102. The illustrated single chamber orifice fitting 102 includes an orifice fitting housing 104 which defines a flow bore 106 which is associated with a pipeline (not shown) and through which fluid flow (indicated by arrow 108) moves. The housing 104 also defines a single chamber 110 within which an orifice plate or, in this case, insert 100 may be disposed.

Except where otherwise described, the flow measurement insert 100 is constructed and operates in the same manner as the insert 50 described previously. The insert 100 includes lifting bar 112 with a flow measurement portion 114 which extends downwardly therefrom. The flow measurement portion 114 includes a central opening flow restriction 116 which functions in the same manner as the central opening 56 described previously, including having a sill 118 and pressure detection port 120 which detects fluid pressure within the central opening 56. A fluid passage 122 extends from the pressure detection port 120 to an opening 124 within the lifting bar 112. Suitable pressure measurement apparatus, of a type known in the art, may be associated with the opening 124 to measure fluid pressure at the central opening 56. The flow measurement insert 100 for the single-chamber fitting 102 can also be modified with double block and bleed upstream-downstream o-rings, similar to that shown for the dual-chamber insert 50 to detect any leakage between the upstream and downstream sides of the insert 100 when it is installed in the fitting 102.

What is claimed is:

1. A flow measurement insert for an orifice fitting comprising:
    an insert body which is shaped and sized to be disposed within a chamber of the orifice fitting, the insert body presenting an upstream face to receive fluid flow within a flow bore defined within the orifice fitting;
    an opening disposed within the insert body, the opening being defined by a sill; and
    a pressure detection port formed within the insert body in fluid communication with the sill for detection of fluid pressure within the opening.

2. The flow measurement insert of claim 1 further comprising:
    an annular groove formed within the sill.

3. The flow measurement insert of claim 1 further comprising:
    an angled upstream surface which extends from the upstream face and adjoins the sill.

4. The flow measurement insert of claim 1 further comprising:
    a toothed portion formed on the insert body to intermesh with a gear of the orifice fitting.

5. The flow measurement insert of claim 1 further comprising:
    an axial face on the insert body;
    first and second o-ring seals disposed upon axial face, each of which seal against the orifice fitting to seal off a radial space therebetween; and
    a leak detection passage formed within the insert body in fluid communication with the radial space to permit detection of leakage into the radial space from the flow bore.

6. The flow measurement insert of claim 1 further comprising:
    a downstream face on the insert body;
    first and second o-ring seals disposed upon downstream face, each of which seal against the orifice fitting to seal off a radial space therebetween; and
    a leak detection passage formed within the insert body in fluid communication with the radial space to permit detection of leakage into the radial space from the flow bore.

7. The flow measurement insert of claim 1 further comprising:
    a lifting bar located at an upper end of the insert body; and
    a fluid passage at least partially defined within the lifting bar which is in fluid communication with the pressure detection port.

8. An orifice fitting comprising:
    an orifice fitting housing defining a fluid flowbore and a chamber for retention of an insert;
    a flow measurement insert having an insert body which is shaped and sized to be disposed within a chamber of the orifice fitting, the insert body presenting an upstream face to receive fluid flow within a flow bore defined within the orifice fitting, an opening disposed within the insert body, the opening being defined by a sill, and
    a pressure detection port formed within the insert body in fluid communication with the sill for detection of fluid pressure within the opening.

9. The orifice fitting of claim 8 further comprising:
    an annular groove formed within the sill.

10. The orifice fitting of claim 8 further comprising:
    an angled upstream surface which extends from the upstream face and adjoins the sill.

11. The orifice fitting of claim 8 further comprising:
    a rotatable toothed gear retained within the orifice fitting housing; and
    a toothed portion formed on the insert body to intermesh with teeth on the gear of the orifice fitting for insertion or removal of the flow measurement insert.

12. The orifice fitting of claim 8 further comprising:
    an axial face on the insert body;
    first and second o-ring seals disposed upon axial face, each of which seal against the orifice fitting to seal off a radial space therebetween; and
    a leak detection passage formed within the insert body in fluid communication with the radial space to permit detection of leakage into the radial space from the flow bore.

13. The orifice fitting of claim 12 wherein:
    the leak detection passage is in fluid communication with a drain connection via a fluid passage.

14. The orifice fitting of claim 8 further comprising:
    a lifting bar located at an upper end of the insert body; and
    a fluid passage at least partially defined within the lifting bar which is in fluid communication with the pressure detection port.

15. The orifice fitting of claim 8 further comprising:
    a process port within the orifice fitting housing which is in fluid communication with the pressure detection port of the flow measurement insert when the flow measurement insert is within the orifice fitting chamber.

16. The orifice fitting of claim 15 further comprising:
    a first pressure detection port formed within the orifice fitting housing and which is axially upstream of the orifice fitting chamber along the flowbore.

17. The orifice fitting of claim 16 further comprising:
    a second pressure detection port formed within the orifice fitting housing and which is axially upstream of the orifice fitting chamber along the flowbore.

* * * * *